United States Patent [19]

Itoh et al.

[11] Patent Number: 5,946,106
[45] Date of Patent: Aug. 31, 1999

[54] FACSIMILE MACHINE WITH COMMUNICATION MANAGEMENT FUNCTION

[75] Inventors: Shingo Itoh, Komaki; Junji Hatamura, Nagoya, both of Japan

[73] Assignee: Brother Kogyo Kabushiki Kaisha, Nagoya, Japan

[21] Appl. No.: 08/657,094

[22] Filed: Jun. 4, 1996

[30] Foreign Application Priority Data

Jun. 6, 1995 [JP] Japan ................................. 7-139327

[51] Int. Cl.⁶ ............................ H04N 1/32; H04N 1/40; H04N 1/00
[52] U.S. Cl. ..................... 358/442; 358/434; 358/444; 358/404
[58] Field of Search ..................... 358/442, 405, 358/468, 444, 404, 464, 440; 379/100.67, 88, 89, 77, 100.03–100.06, 130, 131, 93.14; 395/115, 114

[56] References Cited

U.S. PATENT DOCUMENTS

| | | | |
|---|---|---|---|
| 4,582,956 | 4/1986 | Doughty | 379/93.14 |
| 5,235,433 | 8/1993 | Clarkson et al. | 358/434 |
| 5,289,530 | 2/1994 | Reese | 379/88 |
| 5,388,150 | 2/1995 | Schneyer et al. | 379/67 |
| 5,394,445 | 2/1995 | Ball et al. | 379/67 |
| 5,428,462 | 6/1995 | Kim et al. | 358/444 |
| 5,448,626 | 9/1995 | Kajiya et al. | 379/67 |
| 5,521,974 | 5/1996 | Hayashi et al. | 379/100.06 |
| 5,541,984 | 7/1996 | Yoshida | 379/100.03 |
| 5,552,901 | 9/1996 | Kikuchi et al. | 358/468 |
| 5,563,932 | 10/1996 | Tachibana et al. | 379/100 |

*Primary Examiner*—Edward L. Coles
*Assistant Examiner*—Cheukfan Lee
*Attorney, Agent, or Firm*—Oliff & Berridge, PLC

[57] ABSTRACT

Facsimile log information pertaining to the transmission and reception of image data is stored in a RAM 9. Telephone log information pertaining to the transmission and reception of voice data is also stored in the RAM 9. Thus stored facsimile log information and the telephone log information are printed out on a management report in a discriminatable manner. By viewing the management report, the user of the facsimile machine can manage not only facsimile communication but also telephone communication performed by the facsimile machine.

20 Claims, 7 Drawing Sheets

CALLER ID LIST

| NO. | DATE | TIME | CALLER ID | NAME | COMMENT |
|---|---|---|---|---|---|
| 01 | 10/10 | 10:15 | 111 112 2222 | SUZUKI | TEL RX |
| 02 | 10/10 | 10:30 | 333 334 4444 | NAKAMURA | TEL |
| 03 | 10/10 | 13:45 | 0123 45 6789 | | TEL RX |
| 04 | 10/10 | 16:00 | 5555 56 6666 | SATO | TAD RX |
| 05 | 10/10 | 17:15 | 111 112 2222 | SUZUKI | TAD |
| 06 | 10/10 | 18:30 | | 987-890-1234 | TEL RX |
| 07 | 10/10 | 19:45 | 777 888 9999 | YAMAMOTO | TEL TX |
| 08 | 10/10 | 10:15 | 111 112 2222 | SUZUKI | RX |
| 09 | 10/10 | 10:30 | 333 334 4444 | NAKAMURA | TX |
| 10 | 10/10 | 13:45 | 0123 45 6789 | | TAD RX |

| | | | CALLER ID LIST | | |
|---|---|---|---|---|---|
| NO. | DATE | TIME | CALLER ID | NAME | COMMENT |
| 01 | 10/10 | 10:15 | 111 112 2222 | SUZUKI | TEL RX |
| 02 | 10/10 | 10:30 | 333 334 4444 | NAKAMURA | TEL |
| 03 | 10/10 | 13:45 | 0123 45 6789 | | TEL RX |
| 04 | 10/10 | 16:00 | 5555 56 6666 | SATO | TAD RX |
| 05 | 10/10 | 17:15 | 111 112 2222 | SUZUKI | TAD |
| 06 | 10/10 | 18:30 | | 987-890-1234 | TEL RX |
| 07 | 10/10 | 19:45 | 777 888 9999 | YAMAMOTO | TEL TX |
| 08 | 10/10 | 10:15 | 111 112 2222 | SUZUKI | RX |
| 09 | 10/10 | 10:30 | 333 334 4444 | NAKAMURA | TX |
| 10 | 10/10 | 13:45 | 0123 45 6789 | | TAD RX |

FIG. 7

FACSIMILE MACHINE WITH COMMUNICATION MANAGEMENT FUNCTION

BACKGROUND OF THE INVENTION

1. Field of the Invention

The present invention relates to a facsimile machine and more particularly to a facsimile machine provided with a function for printing log information pertaining to facsimile communications.

2. Description of the Related Art

There is conventionally known a facsimile machine of a type which can print out log information pertaining to facsimile communications, that is, log information indicating when and to whom image data was sent, and when and from whom image data was received.

In this type of facsimile machine, a facsimile log information memory is provided for storing log information on facsimile communications the facsimile machine has performed with remote facsimile machines. A printer provided to the facsimile machine prints out a facsimile management report showing the facsimile log information.

The facsimile machine is generally provided with a handset. A user of the facsimile machine can therefore perform a telephonic communication via the handset with remote facsimile machines or remote telephones. The user of the facsimile machine can thus perform not only facsimile communications, i.e., image data transmission/reception operations, but also telephonic communications, i.e., voice data transmission/reception operations.

SUMMARY OF THE INVENTION

It is therefore, an object of the present invention to provide an improved facsimile machine with which a user can keep track of not only image data communications but also voice data communications performed by the facsimile machine.

In order to this and other objects, the present invention provides a facsimile machine for transmitting information to and for receiving information from remote communication machines, the facsimile machine comprising: image data communication means for transmitting image data to and for receiving image data from remote communication machines; voice data communication means for transmitting voice data to and for receiving voice data from remote communication machines; log information storing means for storing log information on the transmission and reception of both image data and voice data; and log information output means for outputting the log information. The log information output means may preferably output the log information in a manner that the log information on the transmission and reception of image data is discriminated from the log information on the transmission and reception of voice data. The log information storing means may preferably store the log information in a manner that the log information on the transmission and reception of image data is discriminated from the log information on the transmission and reception of voice data.

According to another aspect, the present invention provides a facsimile machine for transmitting information to and for receiving information from remote communication machines via a communication circuit, the facsimile machine comprising: image data communication means for transmitting image data to and for receiving image data from remote communication machines via a communication circuit; facsimile log information storing means for storing facsimile log information on the transmission and reception of image data; voice data communication means for transmitting voice data to and for receiving voice data from remote communication machines via the communication circuit; telephone log information storing means for storing telephone log information on the transmission and reception of voice data; log information output means for outputting the facsimile log information and the telephone log information in a manner that the facsimile log information is discriminated from the telephone log information.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

A facsimile machine according to a preferred embodiment of the present invention will be described while referring to the accompanying drawings wherein like parts and components are designated by the same reference numerals to avoid duplicating description.

Figure 1:
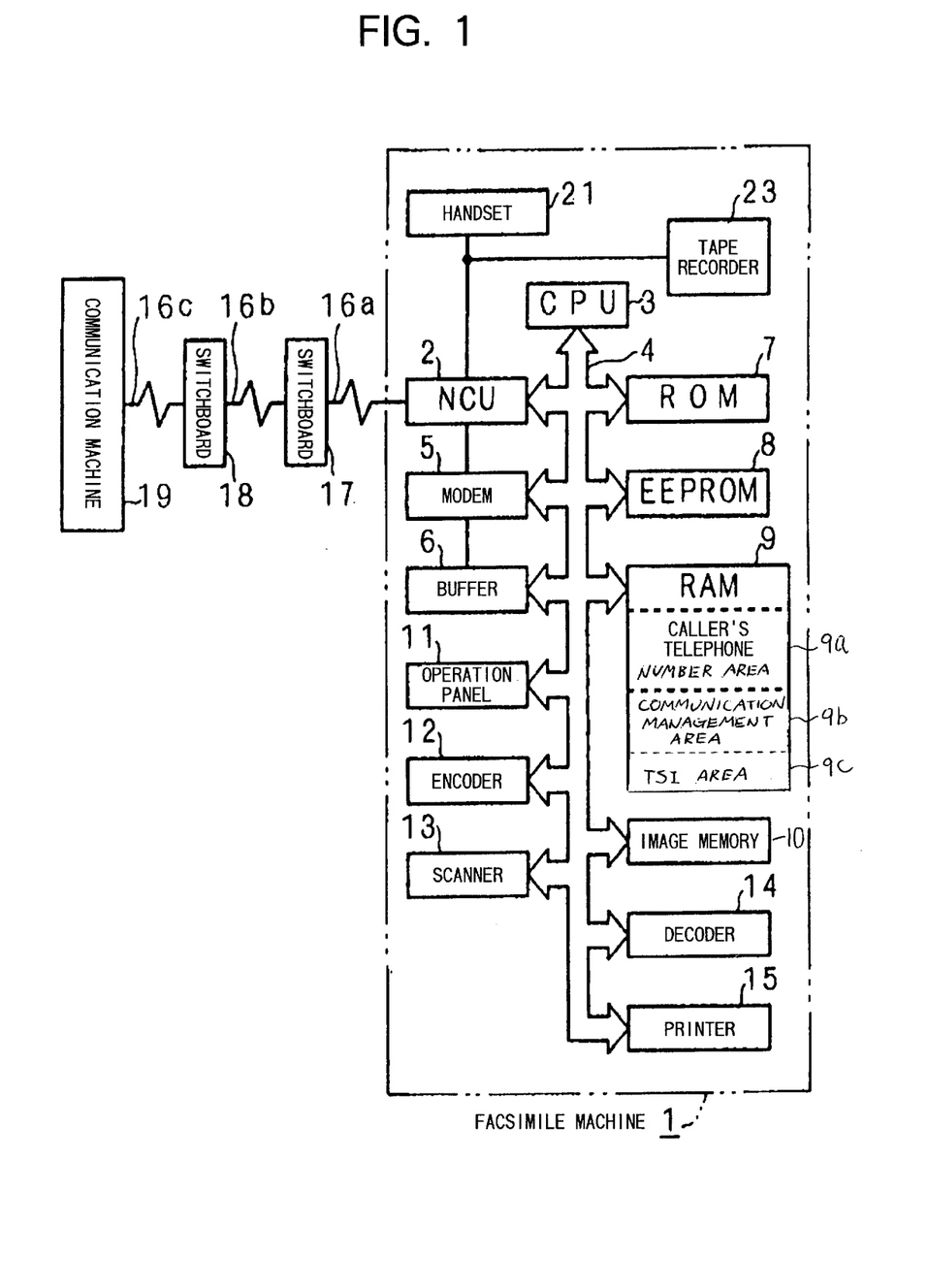
FIG. 1 is a block diagram of a facsimile machine of a preferred embodiment according to the present invention.

FIG. 1 is a block diagram showing a facsimile machine of the embodiment.

As shown in FIG. 1, the facsimile machine 1 (referred to as a present facsimile machine 1 hereinafter) is connected to a telephone circuit 16a via a network control unit (NCU) 2. The NCU 2 is for controlling the telephone circuit 16a. The telephone circuit 16a is connected to a present switchboard 17, which serves the area where the present facsimile machine 1 is located.

A remote communication machine (facsimile machine or telephone) 19 is connected via another telephone circuit 16c to a remote switchboard 18. The remote switchboard 18 serves the region where the remote communication machine 19 is located. A telephone circuit 16b connects the present switchboard 17 and the remote switchboard 18. In the following explanation, the person to receive a facsimile or telephone message using the present facsimile machine 1 will be referred to as a "receiver," and the person attempting to transmit a facsimile or telephone message using the remote communication machine 19 will be referred to as a "caller."

When the caller dials the telephone number of the present facsimile machine 1 at the remote communication machine 19, a call signal will be transmitted via the switchboards 18 and 17 to the present facsimile machine 1. According to the present embodiment, the receiver (i.e., the present facsimile machine 1) is registered as a subscriber to a Calling Number Delivery Service at the present switchboard 17. The Calling Number Delivery Service is one of Custom Local Area Signalling System (CLASS) Services which are described in U.S. Pat. No. 5,289,530. According to the Calling Number Delivery Service, during the silent interval between the first call signal and a subsequent call signal, the caller's telephone number is transmitted to the present facsimile machine 1 via the remote switchboard 18 and the present switchboard 17. This Calling Number Delivery Service is an exchange system set up to exchange telephone numbers between callers and receivers. Such an analog exchange system is already in operation in the United States.

According to the present embodiment, the facsimile machine 1 is capable of transmitting and receiving both image data and voice data. The facsimile machine 1 is provided with a handset 21. The handset 21 is connected to the NCU 2. The handset 21 includes a speaker for converting voice data transmitted through the telephone circuit 16a into voices and a mike for converting the voice of the user into voice data. With the handset 21, the user can perform an actual voice communication with the remote communication machine 19. A bell (not shown in the drawing) is also connected to the NCU 2. A tape recorder 23 is further connected to the NCU 2 for recording voice data transmitted through the telephone circuit 16a onto a cassette tape. The tape recorder 23 is also for reproducing voices from the voice data stored on the cassette tape. When the operator is absent, for example, voice data transmitted from the caller 19 can be recorded in the tape recorder 23, and can be reproduced afterwardly as voices.

In the present facsimile machine 1, a signal bus line 4 connects a CPU 3, which forms the core of the present facsimile machine 1, to other components of the present facsimile machine 1. According to predetermined procedures for controlling transmission, the CPU 3 controls each component to execute facsimile and telephonic communications. That is, the CPU 3 controls each component to perform transmission and reception of image data and voice data. In this example, image data is compressed, encoded, and transmitted between the present facsimile machine 1 and the remote communication machine 19 according to a runlength format.

Although not shown in the drawings, the NCU 2 includes a relay switch connected with the telephone circuit 16a. When the CPU 3 controls the NCU 2 to close the relay switch, the telephone circuit 16a closes whereupon the present facsimile machine 1 is properly connected to the switchboard 17. Image and voice data can be transmitted between the present facsimile machine 1 and the remote communication machine 19 via the telephone circuits 16a, 16b, and 16c and the switchboards 17 and 18. When the CPU 3 controls the NCU 2 to open the relay switch, the telephone circuit 16a is opened whereupon the facsimile machine 1 is disconnected from the remote communication machine 19.

A modem 5 is provided for modulating image data to be transmitted to remote communication machines, for demodulating image data received from remote communication machines, and for transmitting and receiving various types of procedure signals used for transmission and reception of image data. A buffer 6 is provided for temporarily storing image data encoded in the runlength format transmitted from the remote communication machine 19. The buffer 6 also temporarily stores image data which is encoded by an encoding portion 12 (which will be described later) and which is to be transmitted to the remote communication machine 19.

An image memory 10 such as a dynamic RAM (DRAM) is provided as a memory for storing image data transmitted from remote communication machines and temporarily stored in the buffer 6. The image memory 10 also stores bit images to be recorded by a printer 15 (to be described later). A decoding portion 14 is provided for retrieving image data transmitted from a remote communication machine 19 and stored in the image memory 10 and for decoding the retrieved image data for recording operation.

A scanner 13 is provided for reading images from a document set on a document stand (not shown) provided to the facsimile machine 1 and for producing image data to be transmitted to remote communication machines. The encoding portion 12 is provided for encoding the thus produced image data into a format (the runlength format, in this example) suitable for transmission. The encoded image data is temporarily stored in the buffer 6 before being transmitted to remote communication machines.

A ROM 7 is provided as a memory for storing control programs including the programs shown in FIGS. 2 through 5. An EEPROM 8 is provided as a memory for storing various setting information. The EEPROM 8 is formed with an abbreviated-dialing list in its predetermined region as will be described later. A RAM 9 is provided as a memory for temporarily storing various data while various operations are being performed. The RAM 9 includes: a caller's telephone number memory area 9a for storing the telephone numbers of caller's communication machines (telephones and facsimile machines); a communication management memory area 9b for storing log information on facsimile and telephone communications performed by the present facsimile machine 1; and a TSI memory area 9c for storing TSI signals transmitted from remote caller's communication machines.

An operation panel 11 is provided for displaying, on a display, the operation status of the present facsimile machine 1 and also for an operator to manipulate to perform various operations. Although not shown in the drawings, the operation panel 11 includes a numeric pad, function keys, character keys, a management report print key, a start key, and an abbreviated-dialing registration key. The management report print key is for instructing a printer 15 (to be described later) to print out a communication management report. The start key is for instructing the facsimile machine 1 to transmit image data to remote communication machines and to receive image data transmitted from remote communication machines.

The printer 15 is provided for recording on a sheet image data transmitted from remote facsimile machines and stored in the image memory 10. The printer 15 is also for recording a communication management report based on data stored in the communication management memory area 9b of the RAM 9. The printer 15 could be a laser printer for electrostatic-electrophotographically forming toner images on a sheet by first using laser light to form a latent image on a photosensitive drum, using toner to develop the latent image into a visual tone image, and then transferring the toner image onto the sheet.

Next, an explanation of processes conducted by the present facsimile machine 1 will be described below in greater detail, with reference to FIGS. 2 through 5. Individual steps in the flowcharts of these drawings will be represented as Si, wherein i is the number of the step (i.e., i=11, 13, 15, . . . i).

According to the present embodiment, the operator of the present facsimile machine 1 can register, for abbreviated dialing, frequently dialed telephone numbers of remote communication machines (facsimile machines and telephones). The registered telephone numbers and names will be stored in the abbreviated-dialing list provided in a predetermined region of the EEPROM 8.

This abbreviated dialing registration routine will be first described below with reference to the flowchart in FIG. 2.

Figure 2:
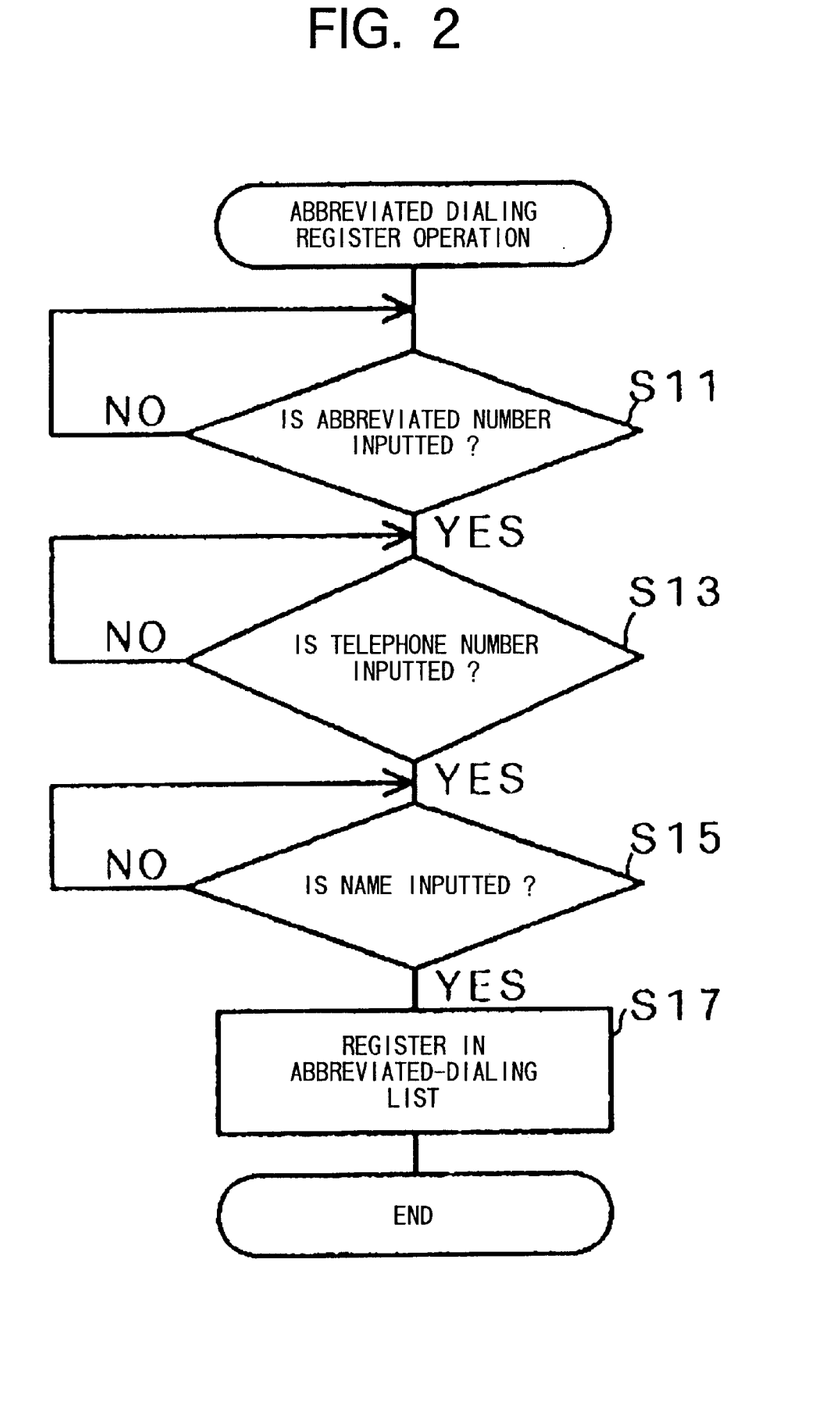
FIG. 2 is a flowchart of an abbreviated-dialing registration process performed by the facsimile machine of FIG. 1.

The routine represented by the flowchart in FIG. 2 is started when the user operates the abbreviated-dialing registration key on the operation panel 11. First, the user manipulates the numeric pad to select an abbreviated-dialing number (for example, from 001 to 200) desired to represent a remote communication machine which the user desires to register in the abbreviated-dialing list. When the abbreviated-dialing number is entered ("Yes" in S11,) then the user further manipulates the numeric pad to enter an actual telephone number of the remote communication machine. When the telephone number is entered (S13:"Yes"), then the user manipulates the character keys to enter the name of the remote communication machine. When the name is entered (S15:"Yes"), the program proceeds to S17. In S17, the inputted actual telephone number and the name of the remote communication machine are stored in the abbreviated-dialing list in correspondence with the selected abbreviation-dialing number. Thus, the abbreviated-dialing registration routine is completed. Table 1 below shows one example of the abbreviated-dialing list thus registered with telephone numbers and names of several remote communication machines.

TABLE 1

| Abbreviated-Dialing Number | Telephone Number | Name of User at Remote Communication Machine |
|---|---|---|
| 001 | 1111122222 | Suzuki |
| 002 | 3333344444 | Nakamura |
| 003 | 5555566666 | Sato |

Figure 3:
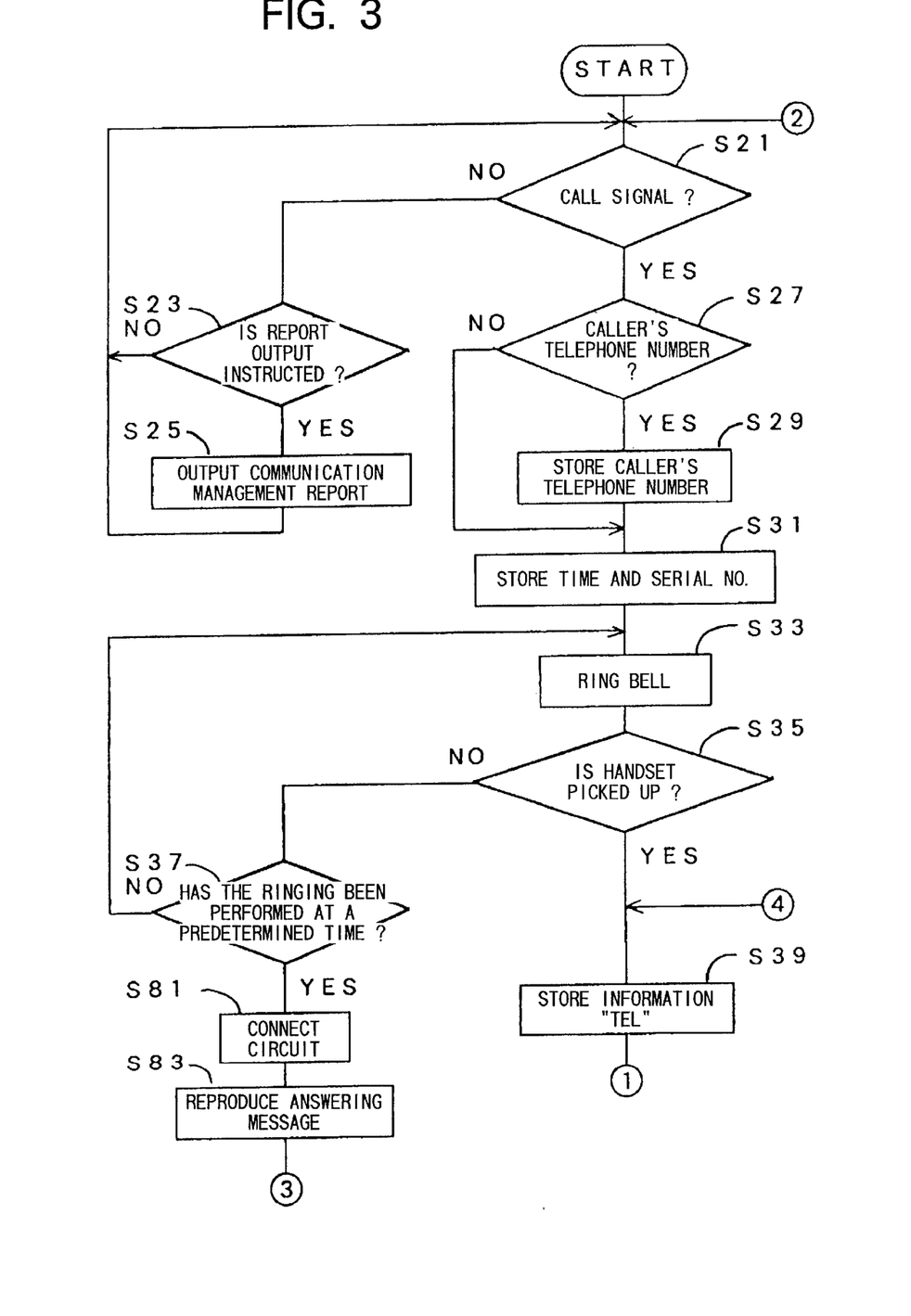
FIG. 3 is a part of a flowchart of a main routine performed by the facsimile machine of FIG. 1.
Figure 4:
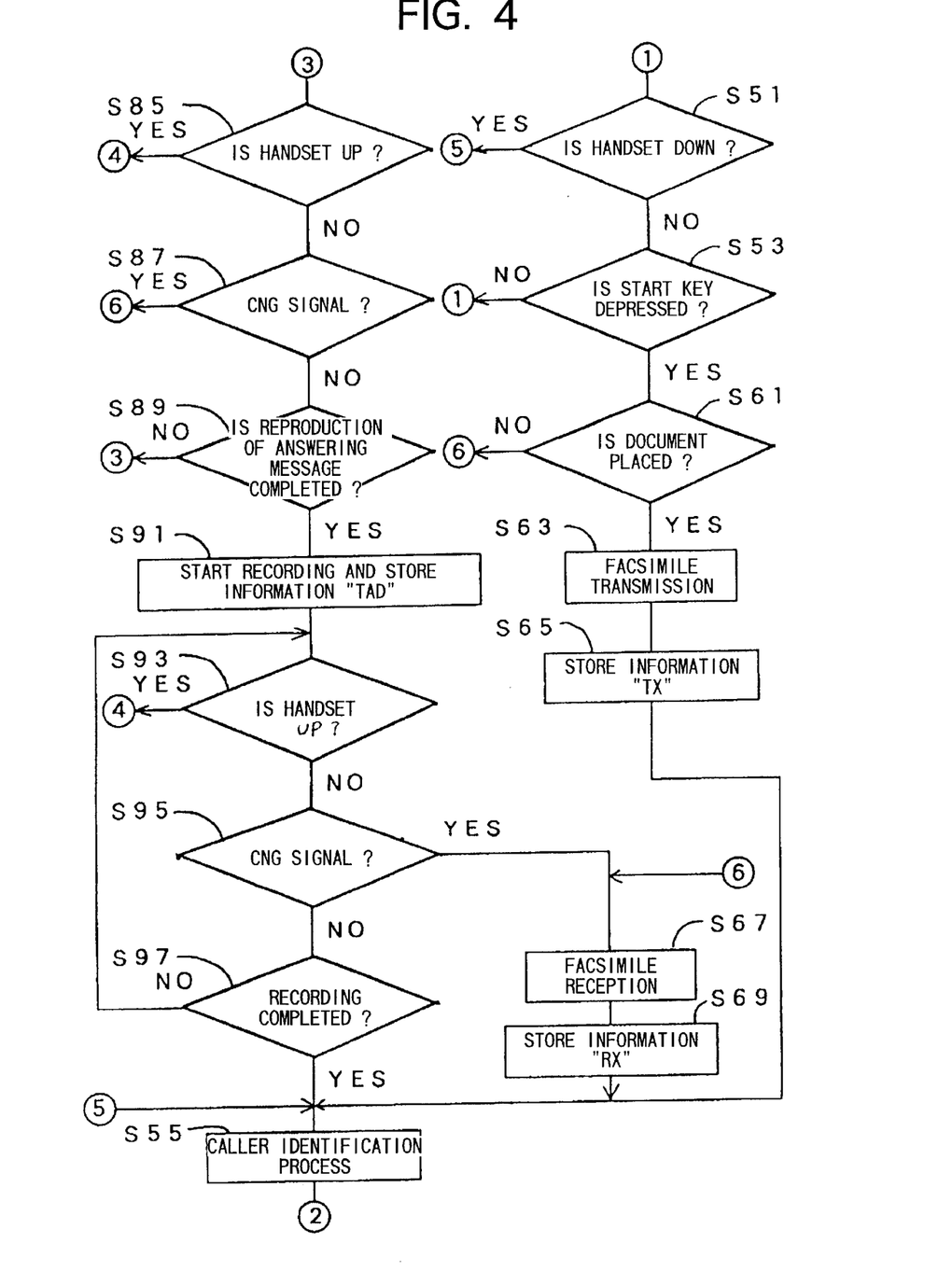
FIG. 4 is a remaining part of the flowchart of the main routine performed by the facsimile machine of FIG. 1.

Next, an explanation of a main routine performed by the present facsimile machine 1 will be provided while referring to the flowcharts of FIGS. 3 and 4. The program starts when the power of the facsimile machine 1 is turned on and the present facsimile machine 1 is put into a condition capable of receiving incoming data.

First, it is determined in S21 whether or not a call signal has arrived. When the facsimile machine 1 has not received any call signal ("No" in S21), the program proceeds to S23 where it is judged whether or not the management report print key is depressed. Until the key is depressed ("No" in S23), the program directly returns to S21. If the management report print key is depressed ("Yes" in S23), a communication management report is printed out in S25. Then, the program proceeds to S21. The communication management report will be described later.

Once a call signal is received (S21:"Yes"), then it is determined in S27 whether or not the caller's telephone number has been transmitted over the present switchboard 17. When the caller's telephone number has been transmitted (S27:"Yes"), the telephone number is temporarily stored in the caller's telephone number memory area 9a in S29. The program then proceeds to S31. On the other hand, if the caller prefers to keep his or her telephone number confidential and therefore the caller's telephone number is not transmitted ("No" in S27), then the program directly proceeds to S31. In S31, various data of the present communication is stored as communication management data in the communication management memory area 9b. In more concrete terms, date and time when the call signal has been received are stored. Also, a serial number assigned to the present communication is stored. The serial number is determined in the order of several communications which the facsimile machine 1 has received.

Then, the program proceeds to S33 where the bell is controlled to ring in an attempt to inform a user of the present facsimile machine 1 that data is incoming. It is then judged in S35 whether or not the user picks up the handset 21. If the user does not pick up the handset 21, it is judged in S37 whether or not the bell has rung a predetermined number of times. Until the bell has performed the predetermined number of rings ("No" in S37), the program returns to S33. When the user picks up the handset 21 within the predetermined number of rings ("Yes" in S35), the NCU 2 closes the telephone circuit 16a, and the program proceeds to S39.

In S39, "TEL" data is added to the communication management memory area 9b. The "TEL" data indicates that the present communication is an actual telephone communication performed via the handset 21. Next in S51, it is judged whether or not the handset is replaced in the cradle of the facsimile machine 1. Until the handset is replaced ("No" in S51), it is further judged in S53 whether or not the start key is depressed on the present facsimile machine 1. When the user performs a telephone communication with the caller without depressing the start key ("No" in S51 and in S53), the program repeatedly performs S51 and S53.

When the user completes the telephone communication with the caller and replaces the handset in the cradle ("Yes" in S51), the program proceeds to S55. In S55, a caller identification process is performed as will be described later. Then, the program returns to S21 so that the present facsimile machine 1 awaits reception of another call signal.

On the other hand, when the user of the present facsimile machine 1 depresses the start key during the telephone communication with the caller ("Yes" in S53), the program proceeds to S61 where it is judged whether a document is properly set on the document stand of the present facsimile machine 1. If a document is properly set on the present facsimile machine 1 ("Yes" in S61), a facsimile transmission operation is performed in S63 so as to transmit image data of the document. Then, in S65, "TX" data is added to the communication management memory area 9b. The "TX" data indicates that the present communication is a facsimile transmission operation. Then, the program proceeds to S55.

Figure 7:
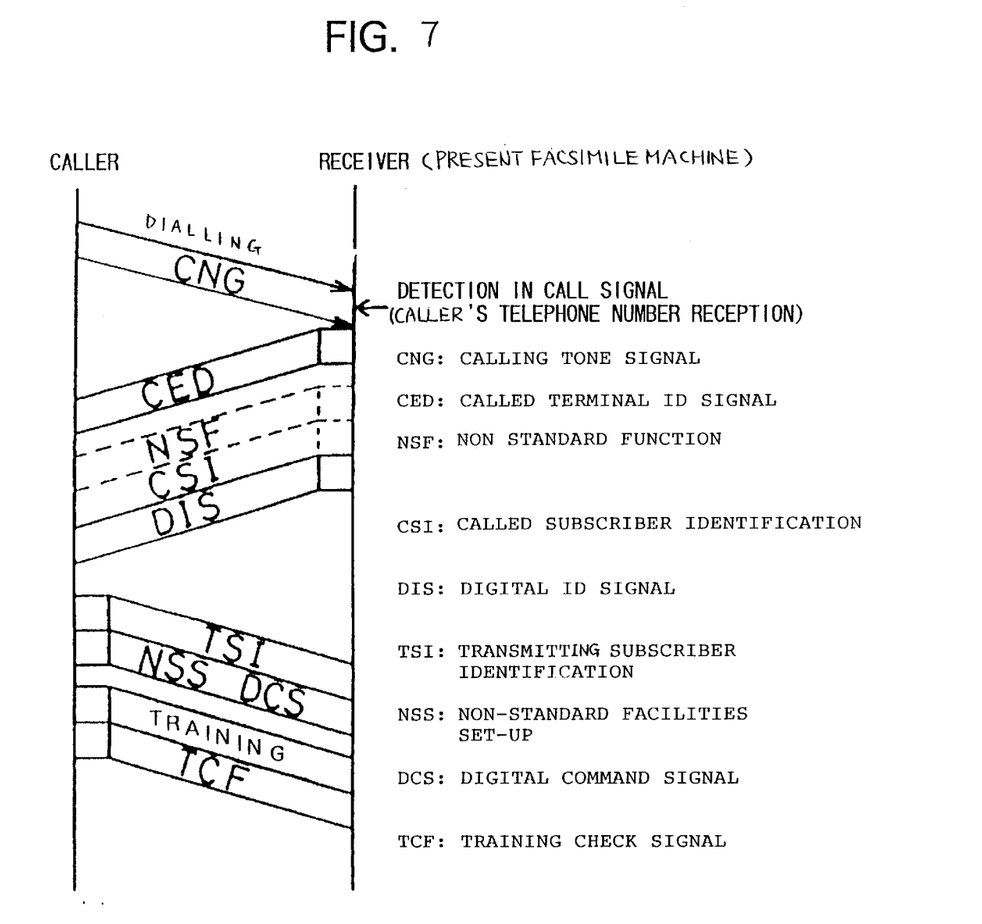
FIG. 7 is a sequence chart schematically showing how signals are transmitted between the present facsimile machine and a remote communication machine before image data is transmitted.

On the other hand, if any documents are not set on the present facsimile machine 1 ("No" in S61), a facsimile reception operation is performed in S67 to receive image data transmitted from the caller 19. It is noted that before receiving the image data, the present facsimile machine 1 receives various signals. For example, the facsimile machine 1 receives signals shown in FIG. 7 before receiving image data. When TSI (Transmitting Subscriber Identification) signals are received from the remote communication machine 19 before receiving image data, the CPU 3 stores the received TSI signals into the TSI memory area 9c in S67. Then, when image data is received, the image data is stored in the image memory 10, decoded by the decoding portion 14, and then printed by the printer 15 onto a sheet of paper.

When the facsimile reception operation of S67 is completed, the program proceeds to S69, in which "RX" data is added to the communication management memory area 9b. The "RX" data indicates that the present communication is a facsimile reception operation. Then, the program proceeds to S55.

It is noted that the TSI signals are signals optionally transmitted from remote communication machines. Accordingly, there are the cases that the remote communication machine 19 does not transmit TSI signals to the present facsimile machine 1. In this case, the memory area 9c is not recorded with TSI signals.

As apparent from the above description, the present facsimile machine 1 can perform a facsimile communication when the user depresses the start key while the user is performing a telephone communication via the handset 21 with a remote communication machine 19.

On the other hand, when the ringing of the bell reaches the predetermined number of times but the user does not pick up the handset 21 ("No" in S37), the program proceeds to S81 where the telephone circuit is forcibly closed. Next, in S83, an answer message prestored in a tape recorder, a sound synthesizing circuit, or the like (not shown in the drawing) is reproduced, and is transmitted as an outgoing message to the caller. The answer message is for urging the caller to speak his/her message or to start sending a facsimile message. Then, in S85, it is judged whether or not the handset is picked up. If not ("No" in S85), it is further judged in S87 whether or not CNG (calling tone) signals are transmitted from the caller 19. CNG signals are for indicating that image data will be transmitted. When the handset is not picked up and CNG signals are not received ("No" in both S85 and S87), it is judged in S89 whether or not the reproduction of the answering message has been completed. If not ("No" in S89), the program returns to S85.

When the user picks up the handset 21 ("Yes" in S85), the program proceeds to S39, where "TEL" data is stored, and a telephone communication is established via the handset 21. On the other hand, when the handset is not picked up ("No" in S85), but CNG signals are received ("Yes" in S87), the program proceeds to S67 to perform the facsimile reception operation. That is, when TSI signals are received, the CPU 3 stores the TSI signals into the memory area 9c. Then, incoming image data is processed and printed. When TSI signals are not received, on the other hand, the incoming image data is processed and printed without storing TSI signals to the memory area 9c.

When reproduction of the answering message is completed but the handset 21 is not picked up or CNG signals are not received ("Yes" in S89), the program proceeds to S91. In S91, the tape recorder 23 is controlled to start recording voice data transmitted from the caller through the telephone circuit 16a. Then, "TAD" data is stored in the communication management memory area 9b. The "TAD" data indicates that the present communication is a telephone message recording operation.

Then, the same judging operations as those in S85 and S87 are performed in S93 and S95. When the handset is not picked up ("No" in S93) and CNG signals are not received ("No" in S95), the program proceeds to S97 to judge whether or not the recording operation of the caller's message is completed. The completion of the message recording operation is determined when a handset of the caller is replaced in the cradle of the remote communication machine 19. Until the message recording operation is completed ("No" in S97), the program returns to S93. When the recording operation is completed ("Yes" in S97), the program proceeds to S55.

As apparent from the above description, the present facsimile machine 1 performs various judgements. The facsimile machine 1 judges: whether or not the handset 21 is picked up; whether or not a document is set: whether or not CNG signals are received, etc. Based on these judgements, the facsimile machine 1 can perform actual telephone communication with the caller 19, can record voice data transmitted from the caller 19 for listening afterward, can transmit image data to the caller 19, and can receive image data transmitted from the caller 19.

Figure 5:
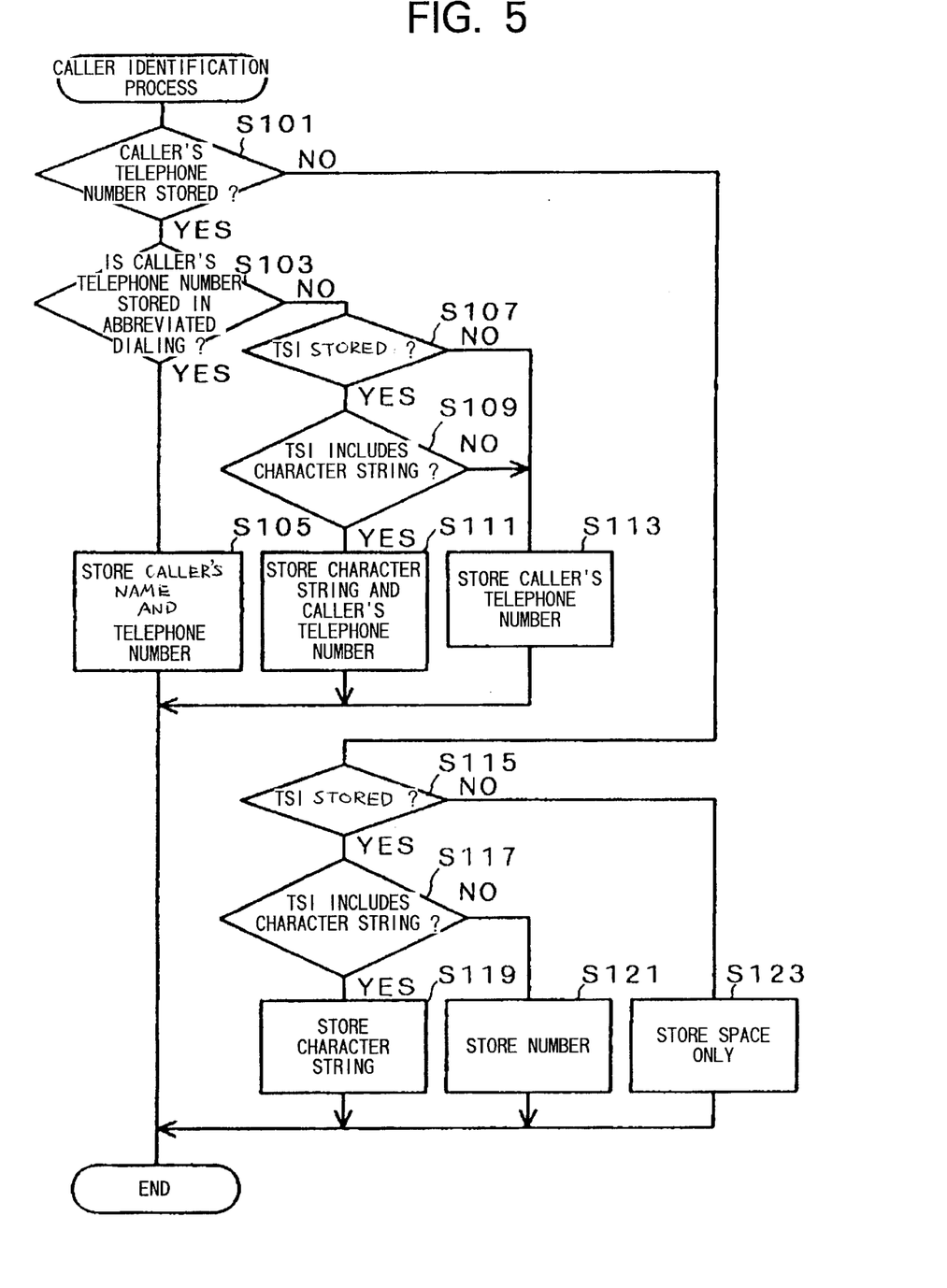
FIG. 5 is a flowchart of a caller identification process in the main routine shown in FIG. 4.

The caller identification process of S55 will be described in greater detail with reference to FIG. 5.

First, in S101, it is judged whether or not the caller's telephone number is stored in the caller's telephone number memory area 9a. If the caller's telephone number is stored in the memory area 9a ("Yes" in S101), it is further judged in S103 whether or not the telephone number is registered in the abbreviated-dial list stored in the EEPROM 8. If the telephone number is registered in the abbreviated-dial list ("Yes" in S103), the caller's name registered in correspondence with the telephone number is read out. The caller's name and telephone number are stored in the communication management data memory area 9b as caller identification data. The caller identification data is thus stored in the communication management data area 9b in correspondence with the already-stored management data: date and time when the communication has been started, the serial number assigned to the communication, and the type of the present communication indicated by at least one of those data "TEL," "TX," "RX," and "TAD." Then, the program returns to the main routine.

On the other hand, if the caller's telephone number is not registered in the abbreviated-dialing list ("No" in S103), the program proceeds to S107. In S107, it is judged whether or not TSI signals are stored in the TSI signal memory area 9c. If TSI signals are stored in the memory area 9c ("Yes" in S107), it is further judged in S109 whether the TSI signals include signals indicative of a character string. If the TSI signals include a character string ("Yes" in S109), the program proceeds to S111 where the character string and the caller's telephone number are stored as caller identification data in the communication management data area 9b.

If the stored TSI signals do not include any character strings ("No" in S109), on the other hand, the program proceeds to S113. Similarly, if TSI signals were not received and therefore are not stored in the memory area 9c ("No" in S107), the program proceeds to S113. In S113, the caller's telephone number only is stored as the caller identification data in the communication management area 9b.

On the other hand, if no caller's telephone number was transmitted from the switchboard 17 so that the caller's telephone number is not stored in the telephone number memory area 9a ("No" in S101), the program proceeds to S115. In S115, it is judged whether or not TSI signals are stored in the memory area 9c. If TSI signals are stored in the memory area 9c ("Yes" in S115), it is further judged in S117 whether the TSI signals include a character string. If the TSI signals include a character string ("Yes" in S117), the character string only is stored as caller identification data in the communication management data area 9b. If the stored TSI signals do not include any character strings ("No" in S117), the program proceeds to S121. Because the TSI signals include signals indicative of a number string, the number string is stored in S121 as the caller identification data in the communication management data area 9b. If TSI signals were not received ("No" in S115) and therefore are not stored in the memory area 9c, the program proceeds to S123. In S123, a space is stored as the caller identification data in the communication management area 9b. Afterward, the caller identification process is completed. The program then returns to the main routine.

When the operator depresses the management report print key after the caller identification process of S55 is completed, the program proceeds to S25. In S25, the communication management data is read out from the management memory area 9b. That is, communication management data of communications performed by the present facsimile machine 1 is retrieved from the memory area 9b. Communication management data of each communication includes: data of date and time when the communication has been started; data of the serial number assigned to the communication, the caller identification data; and at least one of data "TEL," "TX," "RX," and "TAD" indicating the type of the communication. Based on the communication management data, the printer 15 prints out a communication management report on a sheet of paper.

Figure 6:
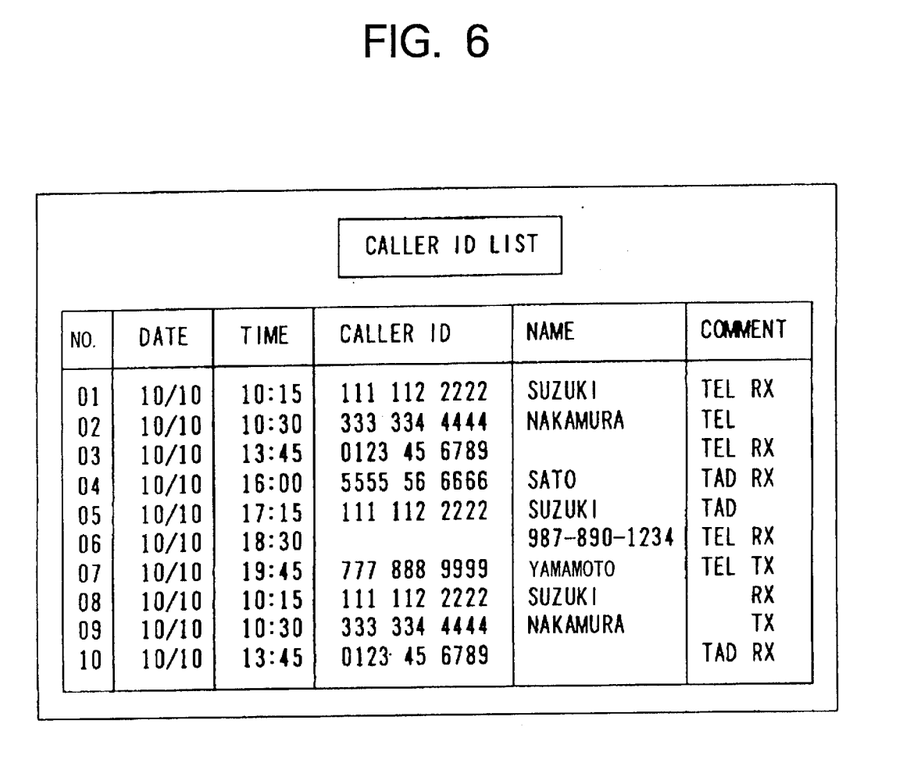
FIG. 6 shows an example of a communication management report printed out by the facsimile machine of FIG. 1.

FIG. 6 shows one example of the communication management report including, starting from the leftend column, a "No." column, a "DATE" column, a "TIME" column, a "CALLER ID" column, a "NAME" column, and a "COMMENT" column. The "NO." column indicates the serial number assigned in the order a communication was performed. The "Date" and "Time" columns indicate when the communication started. The "Caller ID" column indicates the caller's telephone number. The "Name" column indicates caller identification data other than the caller's telephone number. The "Comment" column indicates the type of the communication.

A communication numbered "01" was performed first. In that communication, a caller's telephone number "1111122222" was transmitted from the switchboard 17. Because the telephone number is registered in the abbreviated-dial list shown in Table 1 together with the caller's name "SUZUKI," the caller's name "SUZUKI" is properly printed out in the management report. In that communication, the user performed a telephone communication via the handset 21 and received image data thereafter. Accordingly, "TEL" and "RX" are both printed in the "Comment" column.

In the next communication numbered "02", a caller's telephone number "3333344444" was transmitted from the switchboard 17. Because this telephone number is also registered in the abbreviated-dial list together with the caller's name "NAKAMURA," the caller's name is also properly printed out in the management report. In that communication, the operator performed a telephone communication via the handset 21. Accordingly, "TEL" only is printed in the "Comment" column.

In the next communication numbered "03", a caller's telephone number "0123456789" was transmitted from the switchboard 17. This telephone number is not registered in the abbreviated-dial list. Because no TSI signals were received, a space area is left unprinted in the "Caller ID" column.

In the communication numbered "07", a caller's telephone number "7778889999" was transmitted from the switchboard 17. This telephone number is not registered in the abbreviated-dial list. However, TSI signals, including a character string "Yamamoto," were received in the communication. This character string "Yamamoto" is printed in the "Caller ID" column.

In the communication numbered "06", a caller's telephone number was not transmitted from the switchboard 17. However, TSI signals were received. Because the TSI signals included a number string (telephone number) "987-890-1234," but no name, the number string is printed at the "Caller ID" column.

In the communications numbered "04," "05," "10," voice data was received and recorded by the tape recorder 23 as indicated by the printed data "TAD." In the communication numbered "08," image data transmitted from the caller was received as indicated by the printed data "RX." In the communications numbered "09," image data was transmitted to the caller as indicated by the printed data "TX."

Thus, the present facsimile machine 1 can print out log information pertaining to four kinds of communication: a facsimile transmission operation, a facsimile reception operation, an actual telephone communication via the handset 21, and a telephone message recording operation via the tape recorder 23. Log information on those different kinds of communications can be discriminated by the indications "TX," "RX,", "TEL," and "TAD" printed on the righthand "Comment" column. Thus, the user can keep track of not only image data communications (facsimile communications) but also voice data communications (telephone communications.) Voice data communications can be managed so that actual telephonic communications and tape-recording telephonic communications can be kept track of separately.

In order for a user of a conventional telephone provided with an answering machine function to know what messages were left while he or she was away, the user must reproduce all messages left on the cassette tape starting from the initial position of the cassette tape. According to the present invention, however, when the user returns home, the user may press the management report print key on the facsimile machine 1. Watching the indications "TAD" printed on the "Comment" column of the management report, the user can easily know when and from whom he or she has received telephone messages recorded by the tape recorder 23. The user can therefore control the tape recorder 23 to reproduce only those messages he or she wishes to hear.

Additionally, according to the present embodiment, log information on those communications are printed together with the caller's telephone number and/or a character or number string corresponding to the caller's telephone number or corresponding to the received TSI signals. Accordingly, it is easily possible to know with whom the present facsimile machine 1 has communicated.

In the present embodiment, the caller is identified in preference based on the caller's telephone number transmitted from the switchboard. The caller is identified based on TSI signals only when the caller's telephone number is not transmitted. The caller can therefore be reliably identified as follows.

TSI signals are signals optionally transmitted from remote communication machines. Information transmitted in the TSI signals is limited to what a caller registers in his or her remote communication machines. For example, when a caller does not register the telephone number of the terminal connected to his or her remote communication machine, the TSI signal will not include the corresponding telephone number. Also, when the remote communication machine is connected to a different terminal, so that its telephone number changes, but the user fails to reregister the new number in the communication machine, then TSI signals will incorrectly provide information of the previous telephone number to remote communication machines. There is a possibility that the telephone number information in the TSI signal will remain for the previous telephone number even after the telephone number has been changed.

According to the Caller's Number Delivery System, however, because the caller's telephone number is transmitted as a signal from the switchboard, the switchboard can properly change the signal when the caller's telephone number changes. This information is therefore more reliable than TSI signals. Accordingly, in the present embodiment, the caller is identified in preference based on the caller's telephone number transmitted from the switchboard 18. TSI signals are used only when the caller's telephone number is not transmitted.

According to the present embodiment, the caller's name is determined based on the abbreviated-dialing list and is then printed out on the management report. Accordingly, the management report is reliable.

While the invention has been described in detail with reference to the specific embodiment thereof, it would be apparent to those skilled in the art that various changes and modifications may be made therein without departing from the spirit of the invention.

For example, the communication management report may not be printed out on a paper. For example, the management report may be displayed on the display (not shown) provided to the operation panel 11.

The present invention can be applied to a facsimile machine which is not registered as a subscriber to the Calling Number Delivery Service. The present invention can be applied further to a facsimile machine which is not provided with the tape recorder 23 having the answering function.

As described above, the facsimile machine of the present invention transmits image data to and receives image data from remote communication machines via a communication circuit. The facsimile machine also transmits voice data to and receives voice data from remote communication machines via the communication circuit. Facsimile log information pertaining to the transmission and reception of image data is stored in a memory. Telephone log information pertaining to the transmission and reception of voice data is also stored in the memory. Thus stored facsimile log information and the telephone log information are outputted in a discriminatable manner. By viewing the outputted facsimile and telephone log information, the user of the facsimile machine can keep track of not only facsimile communications but also telephone communications performed by the facsimile machine.

The facsimile machine may be provided with a handset. The handset is capable of converting voice data transmitted from remote communication machines into actual voices and is capable of converting actual voices into voice data for being transmitted to the remote communication machine. Accordingly, the operator of the facsimile machine can perform a telephonic conversation with the remote communication machines via the handset.

The facsimile machine may be constructed to be capable of recording the voice data transmitted from the remote communication machines. Accordingly, when the operator is away from the facsimile machine, the incoming voice data can be recorded for listening afterward. In this case, handset telephone log information on actual voice data communications performed using the handset is preferably stored separately from recorded telephone log information on recorded voice data. Accordingly, the facsimile log information, the handset-used telephone log information, and the recorded telephone log information may preferably be outputted in a discriminatable manner. By viewing the outputted log information, the user can further keep track of the recorded incoming telephone messages and the actually-performed telephone conversations.

The facsimile machine may be constructed to be capable of receiving signals indicative of the caller's telephone number and transmitted from a switchboard connected to the facsimile machine via the communication circuit. In this case, the facsimile log information and the telephone log information may be outputted together with information on the caller determined using the received caller's telephone number. In this case, the user can easily know with whom facsimile and telephone communications have been performed.

The facsimile machine may be stored with a dial list which lists telephone numbers of several remote communication machines in correspondence with character strings indicative of the remote communication machines. Accordingly, when receiving caller's telephone number signals, one of the character strings is selected based on the received caller's telephone number. In this case, the facsimile log information and the telephone log information may be outputted together with the selected character string. The character string is for identifying the caller. For example, the character string is the caller's name. Accordingly, the user can easily know who called.

What is claimed is:

1. A facsimile machine for transmitting information to and for receiving information from remote communication machines, the facsimile machine comprising:

control means for controlling connection with remote communication machines via a voice or facsimile communication circuit;

image data communication means for transmitting image data to and for receiving image data from remote communication machines via the connected voice or facsimile communication circuit;

voice data communication means for transmitting voice data to and for receiving voice data from remote communication machines via the connected voice or facsimile communication circuit;

log information storing means for storing log information on the transmission and reception of both image data and voice data;

caller's telephone number receiving means receiving caller identification signals, indicative of a caller's telephone number, and storing information on the caller's telephone number in the log information storing means before the control means connects the voice or facsimile communication circuit;

identification data receiving means for receiving sender identification data from a remote communication machine preceding transmission of image data, and storing the sender identification data in the log information storage means upon receipt; and log information output means for outputting using as a primary data source the data received by the caller's telephone number receiving means and as a secondary source the data received by the identification data receiving means the log information, said log information output means outputting the log information in a manner that the log information on the transmission and reception of image data is discriminated from the log information on the transmission and reception of voice data.

2. The facsimile machine as claimed in claim 1, wherein the log information storing means stores the log information in a manner that the log information on the transmission and reception of image data is discriminated from the log information on the transmission and reception of voice data.

3. The facsimile machine as claimed in claim 2, wherein the voice data communication means includes a handset, the handset including:
   a speaker for converting voice data transmitted from remote communication machines into actual voices and for outputting the actual voices; and
   a microphone for converting actual voices into voice data for being transmitted to the remote communication machines.

4. The facsimile machine as claimed in claim 3, wherein the voice data communication means further includes voice data recordation means for recording the voice data transmitted from the remote communication machines.

5. The facsimile machine as claimed in claim 4, wherein the log information storing means stores log information on the transmission and reception of voice data performed using the handset and log information on the reception of voice data performed using the voice data recordation means in a discriminatable manner, the log information output means outputting the log information on the transmission and reception of voice data performed using the handset and the log information on the reception of voice data performed using the voice data recordation means in a discriminatable manner.

6. The facsimile machine as claimed in claim 5, wherein the log information storing means stores log information on the transmission of image data and log information on the reception of image data in a discriminatable manner, the log information output means outputting the log information on the transmission of image data and the log information on the reception of image data in a discriminatable manner.

7. The facsimile machine as claimed in claim 1, wherein the log information storing means includes caller identification means for determining a remote communication machine, to whom the image data communication means transmits image data and the voice data communication means transmits voice data, and from whom the image data communication means receives image data and the voice data communication means receives voice data, the log information output means outputting the log information together with information on the determined remote communication machines.

8. The facsimile machine as claimed in claim 7, wherein the caller identification means determines the remote communication machine based on TSI signals transmitted from the remote communication machines.

9. The facsimile machine as claimed in claim 7, wherein the caller identification means determines the remote communication machine based on the caller's telephone number received by the caller's telephone number receiving means.

10. The facsimile machine as claimed in claim 9, wherein the caller identification means further includes:
    dial list memory means for storing telephone numbers of several remote communication machines in correspondence with character strings indicative of the remote communication machines; and
    character string select means for selecting one of the character strings based on the received caller's telephone number, and
    wherein the log information output means outputs the log information together with the received caller's telephone number and the selected character string.

11. The facsimile machine as claimed in claim 1, wherein the log information output means prints out the log information on a sheet of paper.

12. The facsimile machine as claimed in claim 1, wherein the caller's telephone number receiving means receives the signals, indicative of the caller's telephone number, when the control means receives a call signal from the caller.

13. The facsimile machine as claimed in claim 12, wherein the caller's telephone number receiving means receives the signals, indicative of the caller's telephone number, from a switchboard connected to the control means.

14. The facsimile machine as claimed in claim 13, wherein the caller's telephone number receiving means receives the signals, indicative of the caller's telephone number, during a silent interval between successively-transmitted call signals.

15. The facsimile machine as claimed in claim 14, wherein the caller's telephone number receiving means receives the signals, indicative of the caller's telephone number, transmitted from the switchboard connected to the control means according to a calling number delivery system.

16. A facsimile machine for transmitting information to and for receiving information from remote communication machines via a voice or facsimile communication circuit, the facsimile machine comprising:
    a control unit that controls closure of the voice or facsimile communication circuit;
    an image data communication unit transmitting image data to and receiving image data from remote communication machines via the closed voice or facsimile communication circuit;
    a voice data communication unit transmitting voice data to and receiving voice data from remote communication machines via the closed voice or facsimile communication circuit;
    a log information storing unit storing facsimile log information on the transmission and reception of image data and telephone log information on the transmission and reception of voice data;
    a log information output unit outputting the facsimile log information and the telephone log information in a manner that the facsimile log information is discriminated from the telephone log information;
    a caller's telephone number storing unit that stores a caller's telephone number;
    a caller's telephone number receiving unit receiving caller identification signals, indicative of the caller's telephone number, and storing information on the caller's telephone number in the caller's telephone number storing unit before the control unit closes the voice or facsimile communication circuit;
    an image data identification storage unit that stores caller identification data preceding image data; and
    a signal discriminating unit that distinguishes the caller identification data from the image data being received and stores the caller identification data in the image data identification storage unit,
    the log information output unit outputting the facsimile log information and the telephone log information together with information on the caller determined by the received caller's telephone number stored in the caller's telephone number storing unit as a primary data source and from caller identification data stored in the image data identification storage unit as a secondary source for facsimile communications.

17. The facsimile machine as claimed in claim 16, wherein the voice data communication unit includes:

a handset converting voice data transmitted from remote communication machines into actual voices and converting actual voices into voice data for being transmitted to the remote communication machines; and a voice data recordation unit recording the voice data transmitted from the remote communication machines, and wherein the log information storing unit separately stores handset-used telephone log information on the actual voice data communication performed using the handset and recorded telephone log information on voice data recorded by the voice data recordation unit, the log information output unit outputting the facsimile log information, the handset-used telephone log information, and the recorded telephone log information in a discriminatable manner.

18. The facsimile machine as claimed in claim 16, wherein the caller's telephone number receiving unit receives the signals, indicative of the caller's telephone number, from a switchboard connected to the control unit via the communication circuit, the log information output unit outputting the facsimile log information and the telephone log information together with information on the caller determined by the received caller's telephone number.

19. The facsimile machine as claimed in claim 18, further comprising:

a dial list memory storing telephone numbers of several remote communication machines in correspondence with character strings indicative of the remote communication machines; and a character string select unit selecting one of the character strings based on the received caller's telephone number, and wherein the log information output unit outputs the facsimile log information and the telephone log information together with the received caller's telephone number and the selected character string.

20. The facsimile machine as claimed in claim 16, wherein the caller's telephone number receiving unit receives the signals, indicative of the caller's telephone number, which are transmitted from a switchboard, connected to the control unit, during a silent interval between successively-transmitted call signals, according to a calling number delivery system.

* * * * *